(12) United States Patent
Walton et al.

(10) Patent No.: US 7,324,429 B2
(45) Date of Patent: Jan. 29, 2008

(54) MULTI-MODE TERMINAL IN A WIRELESS MIMO SYSTEM

(75) Inventors: J. Rodney Walton, Carlisle, MA (US); John W. Ketchum, Harvard, MA (US); Mark S. Wallace, Bedford, MA (US); Steven J. Howard, Ashland, MA (US)

(73) Assignee: QUALCOMM, Incorporated, San Diego, CA (US)

( * ) Notice: Subject to any disclaimer, the term of this patent is extended or adjusted under 35 U.S.C. 154(b) by 988 days.

(21) Appl. No.: 10/693,535

(22) Filed: Oct. 23, 2003

(65) Prior Publication Data

US 2004/0146018 A1    Jul. 29, 2004

Related U.S. Application Data

(60) Provisional application No. 60/421,309, filed on Oct. 25, 2002.

(51) Int. Cl.
*H04B 7/02* (2006.01)
*H04J 11/00* (2006.01)
*H04L 27/28* (2006.01)
*H01Q 3/00* (2006.01)

(52) U.S. Cl. ............... 370/203; 370/280; 370/329; 370/341; 375/260; 375/267; 375/347; 342/368

(58) Field of Classification Search ............. 370/203, 370/280, 329, 341; 375/260, 267, 347; 342/368
See application file for complete search history.

(56) References Cited

U.S. PATENT DOCUMENTS

| | | | |
|---|---|---|---|
| 6,802,035 B2 * | 10/2004 | Catreux et al. ............. 714/746 |
| 6,937,592 B1 * | 8/2005 | Heath et al. ................ 370/342 |
| 7,095,709 B2 * | 8/2006 | Walton et al. .............. 370/208 |
| 7,151,809 B2 * | 12/2006 | Ketchum et al. ........... 375/347 |
| 2003/0012308 A1 * | 1/2003 | Sampath et al. ............ 375/340 |
| 2003/0125040 A1 * | 7/2003 | Walton et al. .............. 455/454 |
| 2004/0082356 A1 * | 4/2004 | Walton et al. .............. 455/522 |
| 2004/0136349 A1 * | 7/2004 | Walton et al. .............. 370/338 |

FOREIGN PATENT DOCUMENTS

| | | |
|---|---|---|
| EP | 1 185 001 A2 | 3/2002 |
| WO | WO 01/76110 A2 | 10/2001 |

* cited by examiner

*Primary Examiner*—Alpus H. Hsu
(74) *Attorney, Agent, or Firm*—Thien T. Nguyen; Thomas R. Rouse

(57) ABSTRACT

A user terminal supports multiple spatial multiplexing (SM) modes such as a steered mode and a non-steered mode. For data transmission, multiple data streams are coded and modulated in accordance with their selected rates to obtain multiple data symbol streams. These streams are then spatially processed in accordance with a selected SM mode (e.g., with a matrix of steering vectors for the steered mode and with the identity matrix for the non-steered mode) to obtain multiple transmit symbol streams for transmission from multiple antennas. For data reception, multiple received symbol streams are spatially processed in accordance with the selected SM mode (e.g., with a matrix of eigenvectors for the steered mode and with a spatial filter matrix for the non-steered mode) to obtain multiple recovered data symbol streams. These streams are demodulated and decoded in accordance with their selected rates to obtain multiple decoded data streams.

32 Claims, 6 Drawing Sheets

MULTI-MODE TERMINAL IN A WIRELESS MIMO SYSTEM

CLAIM OF PRIORITY UNDER 35 U.S.C. §119

The present Application for Patent claims priority to Provisional Application Ser. No. 60/421,309, entitled "MIMO WLAN System," filed Oct. 25, 2002, assigned to the assignee hereof, and expressly incorporated by reference herein.

BACKGROUND

1. Field

The present invention relates generally to communication, and more specifically to a user terminal in a multiple-input multiple-output (MIMO) communication system.

2. Background

A MIMO system employs multiple ($N_T$) transmit antennas and multiple ($N_R$) receive antennas for data transmission and is denoted as an ($N_T$, $N_R$) system. A MIMO channel formed by the $N_T$ transmit and $N_R$ receive antennas may be decomposed into $N_S$ spatial channels, where $N_s \leq \min\{N_T, N_R\}$. The $N_S$ spatial channels may be used to transmit $N_S$ independent data streams to achieve greater overall throughput. In general, spatial processing may or may not be performed at a transmitter and is normally performed at a receiver to simultaneously transmit and recover multiple data streams.

A conventional MIMO system typically uses a specific transmission scheme to simultaneously transmit multiple data streams. This transmission scheme may be selected based on a trade-off of various factors such as the requirements of the system, the amount of feedback from the receiver to the transmitter, the capabilities of the transmitter and receiver, and so on. The transmitter, receiver, and system are then designed to support and operate in accordance with the selected transmission scheme. This transmission scheme typically has favorable features as well as unfavorable ones, which can impact system performance.

There is therefore a need in the art for a user terminal capable of achieving improved performance.

SUMMARY

A user terminal that supports multiple spatial multiplexing (SM) modes for improved performance and greater flexibility is described herein. Spatial multiplexing refers to the transmission of multiple data streams simultaneously via multiple spatial channels of a MIMO channel. The multiple SM modes may include (1) a steered mode that transmits multiple data streams on orthogonal spatial channels and (2) a non-steered mode that transmits multiple data streams from multiple antennas.

The terminal selects an SM mode to use for data transmission from among the multiple supported SM modes. The SM mode selection may be based on various factors such as the calibration status of the terminal, the amount of data to send, the channel conditions, the capability of the other communicating entity, and so on. For data transmission, multiple data streams are coded and modulated in accordance with their selected rates to obtain multiple data symbol streams. These data symbol streams are then spatially processed in accordance with the selected SM mode to obtain multiple transmit symbol streams. The transmit spatial processing is with a matrix of steering vectors for the steered mode and with an identity matrix for the non-steered mode. The transmit symbol streams are transmitted from multiple antennas and via a first communication link (e.g., uplink).

For data reception, multiple received symbol streams for a second communication link (e.g., downlink) are spatially processed in accordance with the selected SM mode to obtain multiple recovered data symbol streams. The receive spatial processing may be based on the channel eigenvectors for the steered mode and with a spatial filter matrix for the non-steered mode. The spatial filter matrix may be derived based on various receiver spatial processing techniques, as described below. The recovered data symbol streams are then demodulated and decoded in accordance with their selected rates to obtain multiple decoded data streams for the second link. The terminal also transmits/receives pilots and the selected rates for each link.

Various aspects, embodiments, and features of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
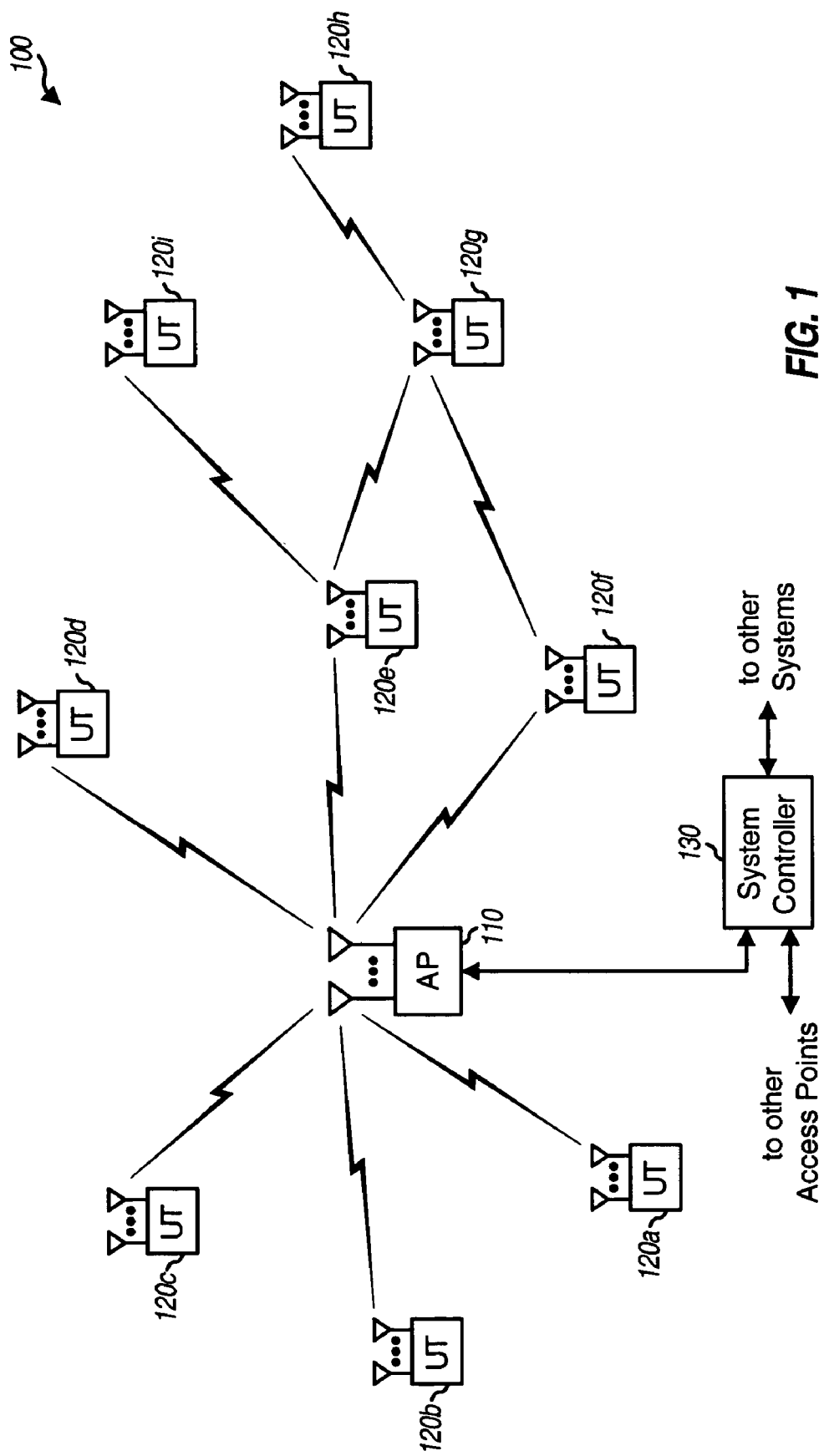
FIG. 1 shows a MIMO system.

FIG. 1 shows a MIMO system 100 with access points (APs) and user terminals (UTs). For simplicity, only one access point 110 is shown in FIG. 1. An access point is generally a fixed station that communicates with the user terminals and may also be referred to as a base station or some other terminology. A system controller 130 couples to and provides coordination and control for the access points. A user terminal may be fixed or mobile and may also be referred to as a mobile station, a wireless device, or some other terminology. A user terminal may communicate with an access point, in which case the roles of access point and user terminal are established. A user terminal may also communicate peer-to-peer with another user terminal.

MIMO system 100 may be a time division duplex (TDD) system or a frequency division duplex (FDD) system. For a TDD system, the downlink and uplink share the same frequency band. For an FDD system, the downlink and uplink use different frequency bands. The downlink is the communication link from the access points to the user terminals, and the uplink is the communication link from the user terminals to the access points. MIMO system 100 may also utilize a single carrier or multiple carriers for data transmission.

Access point 110 and user terminal 120 each support multiple spatial multiplexing (SM) modes for improved performance and greater flexibility. A steered SM mode (or simply, a steered mode) can typically achieve better performance but can only be used if the transmitter has sufficient channel state information (CSI) to orthogonalize the spatial channels of a MIMO channel via decomposition or some other technique. A non-steered SM mode (or simply, a non-steered mode) requires very little information to simultaneously transmit multiple data streams via the MIMO channel, but performance may not be quite as good as the steered mode. A suitable SM mode may be selected for use based on various factors, as described below.

Table 1 summarizes some key aspects of the steered and non-steered modes. Each SM mode has different capabilities and requirements.

For the steered mode, the transmitter transmits a pilot to allow the receiver to estimate the MIMO channel, and the receiver sends back sufficient channel state information to allow the transmitter to derive steering vectors. Either the transmitter or receiver decomposes the MIMO channel into eigenmodes, which may be viewed as orthogonal spatial channels. The receiver also sends back the rate to use for each eigenmode. The transmitter and receiver both perform spatial processing in order to transmit data on the eigenmodes, as described below.

For the non-steered mode, the transmitter transmits a pilot to allow the receiver to estimate the MIMO channel. The receiver sends back the rate to use for each spatial channel. The transmitter transmits data (e.g., from its antennas) without any spatial processing, and the receiver performs spatial processing to recover the transmitted data. The pilot transmission and spatial processing at the transmitter and receiver for the steered and non-steered modes are described below.

TABLE 1

Requirements for Steered and Non-Steered Modes

| | Steered Mode | Non-Steered Mode |
|---|---|---|
| Pilot | Transmitter transmits a pilot Receiver sends back channel state information used by transmitter to derive steering vectors | Transmitter transmits a pilot |
| Rate Feedback | Receiver sends back the rate for each eigenmode | Receiver sends back the rate for each spatial channel (e.g., each transmit antenna) |
| Spatial Processing | Transmitter performs spatial processing with matrix V of steering vectors Receiver performs spatial processing with matrix U of eigenvectors | Transmitter transmits data from each transmit antenna Receiver performs spatial processing with CCMI, MMSE, SIC, and so on (described below) |

In the following description, a user terminal can be the transmitter and/or receiver, and an access point can likewise be the transmitter and/or receiver. Peer-to-peer communications can be supported using the same basic principles.

1. Steered Mode

A MIMO channel formed by $N_T$ transmit antennas and $N_R$ receive antennas may be characterized by an $N_R \times N_T$ channel response matrix $\underline{H}$, which may be expressed as:

$$\underline{H} = \begin{bmatrix} h_{1,1} & h_{1,2} & \cdots & h_{1,N_T} \\ h_{2,1} & h_{2,2} & \cdots & h_{2,N_T} \\ \vdots & \vdots & \ddots & \vdots \\ h_{N_R,1} & h_{N_R,2} & \cdots & h_{N_R,N_T} \end{bmatrix}, \quad \text{Eq (1)}$$

where entry $h_{i,j}$, for $i=1 \ldots N_R$ and $j=1 \ldots N_T$, is the coupling (i.e., complex gain) between transmit antenna j and receive antenna i. For simplicity, the MIMO channel is assumed to be full rank with $N_S \leq N_T \leq N_R$.

Singular value decomposition may be performed on $\underline{H}$ to obtain $N_S$ eigenmodes of $\underline{H}$, as follows:

$$\underline{H} = \underline{U} \underline{\Sigma} \underline{V}^H, \quad \text{Eq (2)}$$

where $\underline{U}$ is an $(N_R \times N_R)$ unitary matrix of left eigenvectors of $\underline{H}$;
$\underline{\Sigma}$ is an $(N_R \times N_T)$ diagonal matrix of singular values of $\underline{H}$;
$\underline{V}$ is an $(N_T \times N_T)$ unitary matrix of right eigenvectors of $\underline{H}$; and
"$^H$" denotes the conjugate transpose.

A unitary matrix $\underline{M}$ is characterized by the property $\underline{M}^H \underline{M} = \underline{I}$, where $\underline{I}$ is the matrix. The columns of a unitary matrix are orthogonal to one another.

The right eigenvectors of $\underline{H}$ are also referred to as steering vectors and may be used for spatial processing by the transmitter to transmit data on the $N_S$ eigenmodes of $\underline{H}$. The left eigenvectors of $\underline{H}$ may be used for spatial processing by the receiver to recover the data transmitted on the $N_S$ eigenmodes. The eigenmodes may be viewed as orthogonal spatial channels obtained through decomposition. The diagonal entries of $\underline{\Sigma}$ are the singular values of $\underline{H}$, which represent the channel gains for the $N_S$ eigenmodes.

In a practical system, only an estimate of $\underline{H}$ can be obtained, and only estimates of $\underline{V}$, $\underline{\Sigma}$ and $\underline{U}$ can be derived. The $N_S$ spatial channels are also typically not completely orthogonal to one another due to various reasons such as an imperfect channel estimate. For simplicity, the description herein assumes channel estimation and decomposition without errors. Furthermore, the term "eigenmode" covers the case where an attempt is made to orthogonalize the spatial channels using decomposition, even though the attempt may not be fully successful due to, for example, an imperfect channel estimate.

Table 2 summarizes the spatial processing at the transmitter and the receiver for the steered mode. In Table 2, $\underline{s}$ is a vector with $N_S$ data symbols to be transmitted on the $N_S$ eigenmodes of $\underline{H}$, $\underline{x}_{st}$ is a vector with $N_T$ transmit symbols to be sent from the $N_T$ transmit antennas, $\underline{r}_{st}$ is a vector with $N_R$ received symbols obtained from the $N_R$ receive antennas, $\hat{\underline{s}}_{st}$ is a vector with $N_S$ recovered data symbols (i.e., $\hat{\underline{s}}_{st}$ is an estimate of $\underline{s}$), and the subscript "st" denotes the steered mode. As used herein, a "data symbol" refers to a modulation symbol for data, and a "pilot symbol" refers to a modulation symbol for pilot.

TABLE 2

Spatial Processing for Steered Mode

| Transmitter | Receiver |
|---|---|
| $\underline{x}_{st} = \underline{V}\underline{s}$ | $\hat{\underline{s}}_{st} = \underline{\Sigma}^{-1}\underline{U}^H \underline{r}_{st}$ |

Eigenvalue decomposition may also be performed on a correlation matrix of $\underline{H}$, which is $\underline{R} = \underline{H}^H \underline{H}$, as follows:

$$\underline{R} = \underline{H}^H \underline{H} = \underline{V} \underline{\Lambda} \underline{V}^H, \quad \text{Eq (3)}$$

where $\underline{\Lambda}$ is a diagonal matrix of eigenvalues, which are the squares of the singular values in $\underline{\Sigma}$. The transmitter can perform spatial processing with $\underline{V}$ to obtain $\underline{x}_{st}$, and the receiver can perform spatial processing with $\underline{V}^H \underline{H}^H$ to obtain $\hat{\underline{s}}_{st}$.

2. Non-Steered Mode

For the non-steered mode, the transmitter can transmit one data symbol stream from each transmit antenna. A spatial channel for this mode can correspond to one transmit antenna. The receiver performs spatial processing to separate out and recover the transmitted data symbol streams. The receiver can use various receiver processing techniques such as a channel correlation matrix inversion (CCMI) technique (which is also known as a zero-forcing technique), a minimum mean square error (MMSE) technique, a successive interference cancellation (SIC) technique, and so on Table 3 summarizes the spatial processing at the transmitter and the receiver for the non-steered mode. In Table 3, $\underline{x}_{ns}$ is a vector with $N_T$ data symbols to be sent from the $N_T$ transmit antennas, $\underline{r}_{ns}$ is a vector with $N_R$ received symbols obtained from the $N_R$ receive antennas, $\underline{M}_{ccmi}$ ccmi is a spatial filter matrix for the CCMI technique, $\underline{M}_{mmse}$ is a spatial filter matrix for the MMSE technique, $\underline{D}_{mmse}$ is a diagonal matrix for the MMSE technique (which contains the diagonal elements of $\underline{M}_{mmse}\underline{H}$), and the subscript "ns" denotes the non-steered mode.

TABLE 3

Spatial Processing for Non-Steered Mode

| Transmitter | Receiver | where | |
|---|---|---|---|
| $\underline{x}_{ns} = \underline{s}$ | $\hat{\underline{s}}_{ccmi} = \underline{M}_{ccmi}\underline{r}_{ns}$ | $\underline{M}_{ccmi} = [\underline{H}^H\underline{H}]^{-1}\underline{H}^H$ | CCMI |
| | $\hat{\underline{s}}_{mmse} = \underline{D}^{-1}_{mmse}\underline{M}_{mmse}\underline{r}_{ns}$ | $\underline{M}_{mmse} = \underline{H}^H[\underline{H}\underline{H}^H + \sigma^2\underline{I}]^{-1}$ and $\underline{D}_{mmse} = \text{diag}[\underline{M}_{mmse}\underline{H}]$ | MMSE |
| | $\hat{\underline{s}}^l_{sic} = \underline{M}^l_{sic}\underline{r}^l_{sic}$ | $\underline{M}^l_{sic} = \underline{M}^l_{ccmi}$ or $(\underline{D}^l_{mmse})^{-1}\underline{M}^l_{mmse}$ | SIC |

For simplicity, the MIMO channel noise $\underline{n}$ is assumed to be additive white Gaussian noise (AWGN) with zero mean, a variance of $\sigma^2$, and an autocovariance matrix of $\underline{\phi}_{nn} = E[\underline{n}\underline{n}^H] = \sigma^2\underline{I}$.

For the SIC technique, the receiver processes the $N_R$ received symbol streams in $N_S$ successive stages to recover one data symbol stream in each stage. For each stage l, where $l=1 \ldots N_S$, the receiver initially performs spatial processing on $N_R$ input symbol streams for stage l using the CCMI, MMSE, or some other technique and obtains one recovered data symbol stream. The $N_R$ received symbol streams are the $N_R$ input symbol streams for stage 1. The receiver further processes (e.g., demodulates, deinterleaves, and decodes) the recovered data symbol stream for stage l to obtain a decoded data stream, estimates the interference this stream causes to the other data symbol streams not yet recovered, and cancels the estimated interference from the $N_R$ input symbol streams for stage l to obtain $N_R$ input symbol streams for stage l+1. The receiver then repeats the same processing on the $N_R$ input symbol streams for stage l+1 to recover another data symbol stream.

For each stage l, the SIC receiver derives a spatial filter matrix $\underline{M}^l_{sic}$ for that stage based on a reduced channel response matrix $\underline{H}^l$ and using the CCMI, MMSE, or some other technique. The reduced matrix $\underline{H}^l$ is obtained by removing l−1 columns in the original matrix $\underline{H}$ corresponding to the l−1 data symbol streams already recovered. The matrix $\underline{M}^l_{sic}$ has dimensionality of $(N_T-l+1) \times N_R$. Since $\underline{H}^l$ is different for each stage, $\underline{M}^l_{sic}$ is also different for each stage.

The receiver may also use other receiver spatial processing techniques to recover the transmitted data symbol streams.

Figure 2:
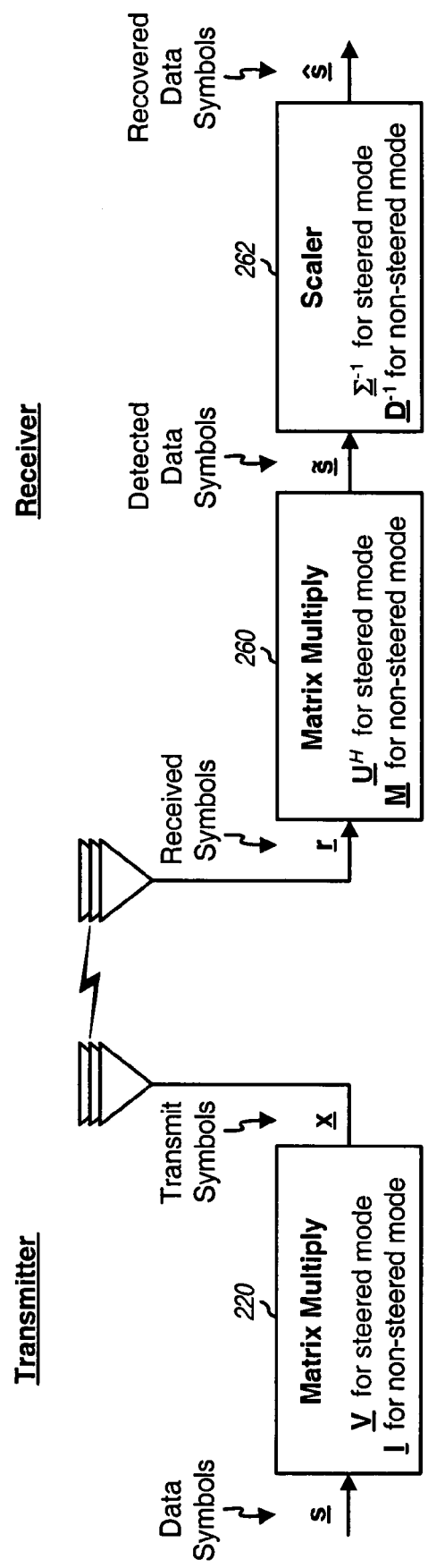
FIG. 2 shows spatial processing at a transmitter and receiver for the steered and non-steered modes.

FIG. 2 shows the spatial processing at the transmitter and receiver for the steered and non-steered modes. At the transmitter, the data vector $\underline{s}$ is multiplied with either the matrix $\underline{V}$ for the steered mode or the identity matrix $\underline{I}$ for the non-steered mode by a unit 220 to obtain the transmit symbol vector $\underline{x}$. At the receiver, the received symbol vector $\underline{r}$ is multiplied with either the matrix $\underline{U}^H$ for the steered mode or the spatial filter matrix $\underline{M}$ for the non-steered mode by a unit 260 to obtain a detected symbol vector $\tilde{\underline{s}}$, which is an unnormalized estimate of $\underline{s}$. The matrix $\underline{M}$ may be derived based on the CCMI, MMSE, or some other technique. The vector $\tilde{\underline{s}}$ is further scaled with either the diagonal matrix $\underline{\Sigma}^{-1}$ for the steered mode or a diagonal matrix $\underline{D}^{-1}$ for the non-steered mode to obtain the recovered data symbol vector $\hat{\underline{s}}$, where $\underline{D}^{-1} = \underline{I}$ for the CCMI technique and $\underline{D}^{-1} = \underline{D}^{mmse-1}$ for the MMSE technique.

3. Overhead for Steered and Non-Steered Nodes

The steered and non-steered modes have different pilot and overhead requirements, as shown in Table 1 and described below.

A. Pilot Transmission

For both the steered and non-steered modes, the transmitter can transmit a MIMO pilot (which is an unsteered pilot) to allow the receiver to estimate the MIMO channel and obtain the matrix $\underline{H}$. The MIMO pilot comprises $N_T$ orthogonal pilot transmissions sent from $N_T$ transmit antennas, where orthogonality may be achieved in time, frequency, code, or a combination thereof. For code orthogonality, the $N_T$ pilot transmissions can be sent simultaneously from the $N_T$ transmit antennas, with the pilot transmission from each antenna being "covered" with a different orthogonal (e.g., Walsh) sequence. The receiver "decovers" the received pilot symbols for each receive antenna i with the same $N_T$ orthogonal sequences used by the transmitter to obtain estimates of the complex channel gain between receive antenna i and each of the $N_T$ transmit antennas. The covering at the transmitter and the decovering at the receiver are performed in similar manner as for a Code Division Multiple Access (CDMA) system. For frequency orthogonality, the $N_T$ pilot transmissions for the $N_T$ transmit antennas can be sent simultaneously on different subbands of the overall system bandwidth. For time orthogonality, the $N_T$ pilot transmissions for the $N_T$ transmit antennas can be sent in different time slots. In any case, the orthogonality among the $N_T$ pilot transmissions allows the receiver to distinguish the pilot transmission from each transmit antenna.

For the steered mode, the receiver sends back sufficient channel state information to allow the transmitter to derive the steering vectors. The receiver may send this information in a direct form (e.g., by sending the entries of $\underline{V}$) or in an indirect form (e.g., by transmitting a steered or unsteered pilot).

B. Rate Selection/Control

The receiver can estimate the received signal-to-noise-and-interference ratio (SNR) for each spatial channel, which can correspond to an eigenmode for the steered mode or a transmit antenna for the non-steered mode. The received SNR is dependent on the SM mode and spatial processing technique used by the transmitter and receiver.

Table 4 summarizes the received SNR for the steered and non-steered modes. In Table 4, $P_m$ is the transmit power used for spatial channel m, $\sigma^2$ is the noise variance, $\sigma_m$ is the singular value for eigenmode m (i.e., the m-th diagonal element of $\underline{\Sigma}$), $r_{mm}$ is the m-th diagonal element of $\underline{R}$ (which is $\underline{R}=\underline{H}^H\underline{H}$), $q_{mm}$ is the m-th diagonal element of $\underline{Q}$, and $\gamma_m$ is the SNR for spatial channel m. The received SNRs for the SIC technique are dependent on the spatial processing technique (e.g., CCMI or MMSE) and the order in which the data streams are recovered. An operating SNR can be defined as being equal to the received SNR plus an SNR back-off factor. The SNR back-off factor can be set to a positive value to account for estimation error, SNR fluctuation over time, and so on, but may also be set to zero.

TABLE 4

Received SNR

| Steered Mode | Non-Steered Mode | |
|---|---|---|
| | CCMI | MMSE |
| $\gamma_{st,m} = \dfrac{P_m \cdot \sigma_m^2}{\sigma^2}$ | $\gamma_{ccmi,m} = \dfrac{P_m}{r_{mm} \cdot \sigma^2}$ | $\gamma_{mmse,m} = \dfrac{q_{mm}}{1-q_{mm}} P_m$ |

The MIMO system may support a set of rates. Each non-zero rate is associated with a particular data rate or spectral efficiency, a particular coding scheme, a particular modulation scheme, and a particular SNR required to achieve a target level of performance (e.g., one percent packet error rate (PER)). The required SNR for each rate may be determined by computer simulation, empirical measurement, and so on, and with an assumption of an AWGN channel. A look-up table (LUT) can store the rates supported by the system and their required SNRs. For each spatial channel, the highest rate in the look-up table with a required SNR that is equal to or less than the operating SNR of the spatial channel is selected as the rate to use for the spatial channel.

Closed-loop rate control may be used for each spatial channel or a combination of spatial channels. The receiver can estimate the received SNR for each spatial channel, select the proper rate for the spatial channel, and send back the selected rate. The transmitter can transmit each data symbol stream at the selected rate.

C. Mode Selection

User terminal 120 can use either the steered or non-steered mode at any given moment for communication. The mode selection may be made based on various factors such as the following.

Overhead—The steered mode requires more overhead than the non-steered mode. For the steered mode, the receiver needs to send back sufficient channel state information as well as the rates for the $N_S$ eigenmodes. In some instances, the additional CSI overhead cannot be supported or is not justified. For the non-steered mode, the receiver only needs to send back the rates for the spatial channels, which is much less overhead.

Amount of Data—The steered mode is generally more efficient but also requires more setup steps (e.g., channel estimation, singular value decomposition, and CSI feedback). If only a small amount of data needs to be sent, then it may be quicker and more efficient to transmit this data using the non-steered mode.

Capability—A user terminal may communicate peer-to-peer with another user terminal that supports only one mode (e.g., either the steered or non-steered mode). In this case, the two terminals can communicate using a common mode supported by both user terminals.

Channel Conditions—The steered mode may be more easily supported for static channels, slow varying channels, and channels with a strong line-of-site component (e.g., a Rician channel).

Receiver SNR—The steered mode provides better performance in low SNR conditions. A user terminal may elect to use steered mode when the SNR drops below some threshold.

Calibration Status—The steered mode may be selected for use if the transmitter and receiver are "calibrated" such that the downlink and uplink channel responses are reciprocal of one another. Reciprocal downlink and uplink can simplify the pilot transmission and spatial processing for both the transmitter and receiver for the steered mode, as described below.

A user terminal that is not mobile and is communicating with the same access point may use the steered mode much of the time. A user terminal that is mobile and communicating with different entities (e.g., different access points and/or other user terminals) may use the non-steered mode, until such time that it is more advantageous to use the steered mode. A user terminal may also switch between the steered and non-steered modes, as appropriate. For example, a user terminal may use the non-steered mode for small data bursts (or short data sessions) and at the start of long data bursts (or long data sessions), and may use the steered mode for the remaining portion of the long data bursts. As another example, a user terminal may use the steered mode for relatively static channel conditions and may use the non-steered mode when the channel conditions change more rapidly.

4. TDD MIMO System

A multi-mode user terminal for an exemplary MIMO wireless local area network (WLAN) system is described below. The MIMO WLAN system utilizes orthogonal frequency division multiplexing (OFDM), which is a multi-carrier modulation technique that effectively partitions the overall system bandwidth into multiple (NF) orthogonal subbands. With OFDM, each subband is associated with a respective carrier that may be modulated with data.

The exemplary MIMO WLAN system is a TDD system. A high degree of correlation normally exists between the downlink and uplink channel responses for the TDD system since these links share the same frequency band. However, the responses of the transmit/receive chains at the access point are typically not the same as the responses of the transmit/receive chains at the user terminal. The differences can be determined and accounted for via calibration. The overall downlink and uplink channel responses may then be assumed to be reciprocal (i.e., transpose) of each other. The channel estimation and spatial processing for the steered mode can be simplified with reciprocal downlink and uplink.

Figure 3:
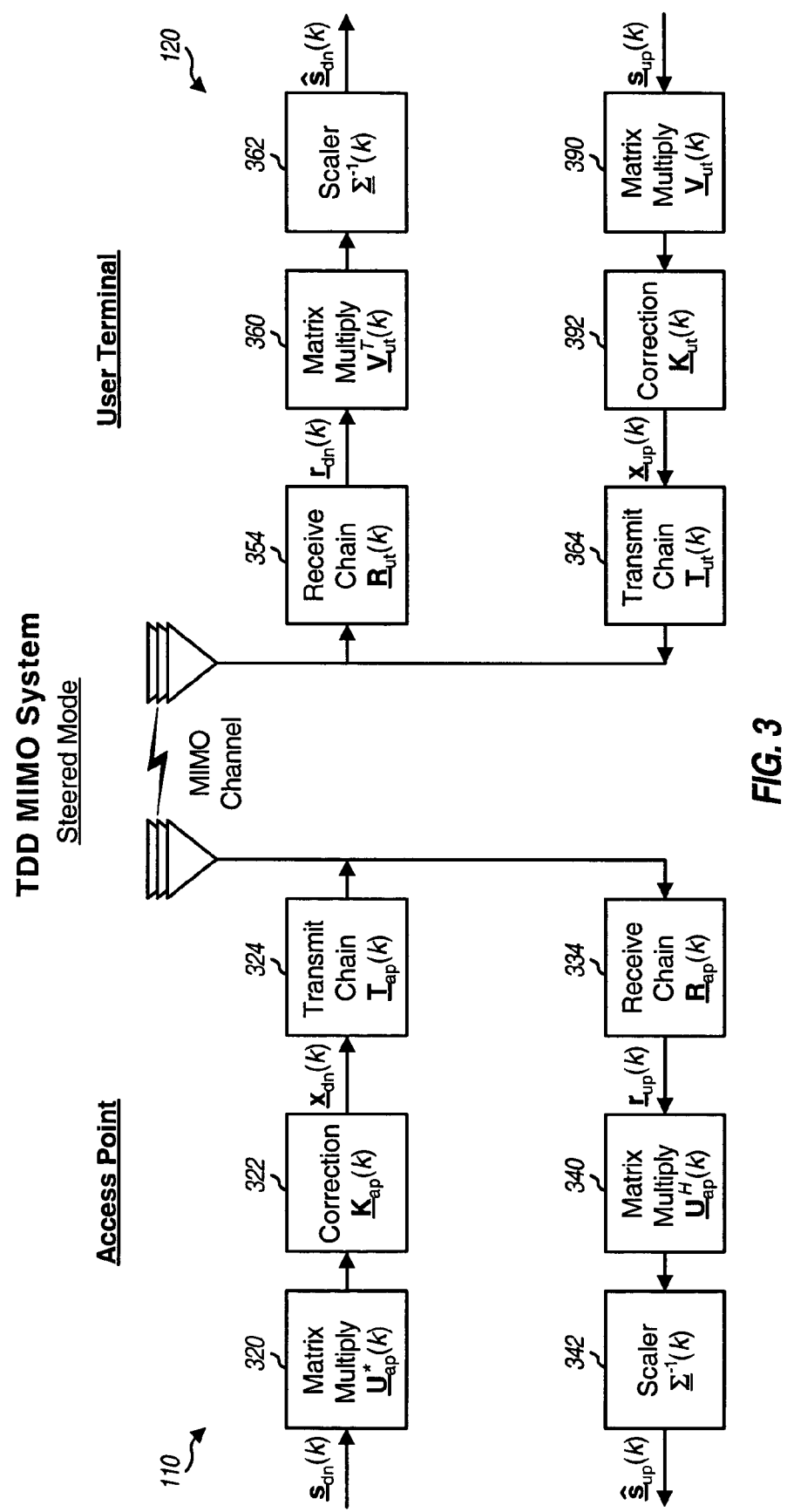
FIGS. 3 and 4 show spatial processing at an access point and a user terminal for the steered and non-steered modes, respectively.

FIG. 3 shows the transmit/receive chains at access point 110 and user terminal 120. At access point 110, transmit chain 324 and receive chain 334 are modeled by matrices $\underline{T}_{ap}(k)$ and $\underline{R}_{ap}(k)$, respectively, for each subband k. At user terminal 120, transmit chain 364 and receive chain 354 are modeled by matrices $\underline{T}_{ut}(k)$ and $\underline{R}_{ut}(k)$, respectively, for each subband k.

Table 5 summarizes the calibration and singular value decomposition for the downlink and uplink in the TDD MIMO WLAN system. The "effective" downlink and uplink channel responses, $\underline{H}_{edn}(k)$ and $\underline{H}_{eup}(k)$, include the responses of the appropriate transmit and receive chains. Diagonal correction matrices $\underline{K}_{ap}(k)$ and $\underline{K}_{ut}(k)$ are obtained by performing calibration with MIMO pilots transmitted by both the access point and user terminal. The "calibrated" downlink and uplink channel responses, $\underline{H}_{cdn}(k)$ and $\underline{H}_{cup}(k)$, include the correction matrices and are reciprocal of one another (i.e., $\underline{H}_{cup}(k) = \underline{H}_{cdn}{}^T(k)$, where "$T$" denotes the transpose).

TABLE 5

Channel Responses for TDD MIMO WLAN System

| | Downlink | Uplink |
|---|---|---|
| Effective Channel Response | $H_{edn}(k) = R_{ut}(k)H(k)T_{ap}(k)$ | $H_{eup}(k) = R_{ap}(k)H^T(k)T_{ut}(k)$ |
| Correction Matrix | $K_{ap}(k) = T^{-1}{}_{ap}(k)R_{ap}(k)$ | $K_{ut}(k) = T^{-1}{}_{ut}(k)R_{ut}(k)$ |
| Calibrated Channel Response | $H_{cdn}(k) = H_{edn}(k)K_{ap}(k)$ | $H_{cup}(k) = H_{eup}(k)K_{ut}(k)$ |
| Singular Value Decomposition | $H_{cdn}(k) = V^*{}_{ut}(k)\Sigma(k)U^T{}_{ap}(k)$ | $H_{cup}(k) = U_{ap}(k)\Sigma(k)V^H{}_{ut}(k)$ |

Because $\underline{H}_{cup}(k)$ and $\underline{H}_{cdn}(k)$ are reciprocal, the matrices $\underline{V}^*{}_{ut}(k)$ and $\underline{U}^*{}_{ap}(k)$ of left and right eigenvectors of $\underline{H}_{cdn}(k)$ are the complex conjugate of the matrices $\underline{V}_{ut}(k)$ and $\underline{U}_{ap}(k)$ of right and left eigenvectors of $\underline{H}_{cup}(k)$. The matrix $\underline{U}_{ap}(k)$ can be used by access point 110 for both transmit and receive spatial processing. The matrix $\underline{V}_{ut}(k)$ can be used by user terminal 120 for both transmit and receive spatial processing.

Singular value decomposition may be performed independently for each of the $N_F$ subbands. For each subband, the singular values in $\Sigma(k)$ may be ordered from largest to smallest, and the eigenvectors in $\underline{V}(k)$ and $\underline{U}(k)$ may be ordered correspondingly. A "wideband" eigenmode may be defined as the set of same-order eigenmodes for all NF subbands after the ordering. The decomposition only needs to be performed by either user terminal 120 or access point 110. If performed by user terminal 120, then the matrices $\underline{U}_{ap}(k)$, for k=1... $N_F$, may be provided to access point 110 in either a direct form (e.g., by sending entries of $\underline{U}_{ap}(k)$) or an indirect form (e.g., by transmitting a steered pilot).

Table 6 summarizes the spatial processing at access point 110 and user terminal 120 for data transmission and reception on the downlink and uplink in the TDD MIMO WLAN system for the steered mode. In Table 6, the subscript "up" denotes the uplink, and the subscript "dn" denotes the downlink.

TABLE 6

Spatial Processing for Steered Mode in TDD MIMO WLAN System

| | Downlink | Uplink |
|---|---|---|
| Access Point | Transmit: $x_{dn}(k) = K_{ap}(k)U^*{}_{ap}(k)s_{dn}(k)$ | Receive: $\hat{s}_{up}(k) = \Sigma^{-1}(k)U^H{}_{ap}(k)r_{up}(k)$ |
| User Terminal | Receive: $\hat{s}_{dn}(k) = \Sigma^{-1}(k)V^T{}_{ut}(k)r_{dn}(k)$ | Transmit: $x_{up}(k) = K_{ut}(k)V_{ut}(k)s_{up}(k)$ |

For the steered mode, the access point can transmit a MIMO pilot on the downlink. The user terminal can estimate the calibrated downlink channel based on the MIMO pilot, perform singular value decomposition, and transmit a steered pilot on the uplink using the matrix $\underline{V}_{ut}(k)$. A steered pilot is a pilot transmitted on the eigenmodes using the same steering vectors that are used for data transmission on the eigenmodes. The access point can directly estimate the matrix $\underline{U}_{ap}(k)$ based on the uplink steered pilot. Pilots may also be transmitted in other manners for the steered mode. For example, the user terminal can transmit the MIMO pilot, and the access point can transmit the steered pilot. As another example, the access point and user terminal can both transmit MIMO pilots.

For the non-steered mode, the transmitter (either the access point or user terminal) can transmit a MIMO pilot along with the data transmission. The receiver performs spatial processing (e.g., with CCMI, MMSE, SIC, or some other technique) to recover the data symbol streams, as described above.

Table 7 summarizes an embodiment of the pilot transmission and spatial processing for the steered and non-steered modes for the TDD MIMO WLAN system.

TABLE 7

Data Transmission in TDD MIMO WLAN System

| | Steered Mode | Non-Steered Mode |
|---|---|---|
| Calibration | Calibration is performed | Calibration is not required |
| Downlink Data Transmission | AP transmits a MIMO pilot UT transmits a steered pilot UT sends the rate for each downlink wideband eigenmode AP transmits data with $U_{ap}(k)$ UT receives data with $V_{ut}(k)$ | AP transmits a MIMO pilot UT sends the rate for each downlink wideband spatial channel AP transmits data from each antenna UT receives data with CCMI, MMSE, SIC, and so on |
| Uplink Data | AP transmits a MIMO pilot UT transmits a steered pilot | UT transmits a MIMO pilot |

TABLE 7-continued

Data Transmission in TDD MIMO WLAN System

| | Steered Mode | Non-Steered Mode |
|---|---|---|
| Transmission | AP sends the rate for each uplink wideband eigenmode UT transmits data with $V_{ut}(k)$ AP receives data with $U_{ap}(k)$ | AP sends the rate for each uplink wideband spatial channel UT transmits data from each antenna AP receives data with CCMI, MMSE, SIC, and so on |

For both the steered and non-steered modes, the receiver (either the access point or user terminal) can estimate the average received SNR for each wideband spatial channel, for example, by averaging the received SNRs (in dB) for the $N_F$ subbands of the wideband spatial channel. A wideband spatial channel can correspond to a wideband eigenmode for the steered mode or a transmit antenna for the non-steered mode. The receiver then computes an operating SNR for each wideband spatial channel as the sum of the average received SNR plus the SNR back-off factor. The receiver then selects the rate for each wideband spatial channel based on the operating SNR and the look-up table of supported rates and their required SNRs.

FIG. 3 shows the spatial processing at access point 110 and user terminal 120 for downlink and uplink data transmission for the steered mode in the MIMO WLAN system. For the downlink, at access point 110, the data symbol vector $\underline{s}_{dn}(k)$ is multiplied with the matrix $\underline{U}^*_{ap}(k)$ by a unit 320 and further scaled with the correction matrix $\underline{K}_{ap}(k)$ by a unit 322 to obtain the transmit symbol vector $\underline{x}_{dn}(k)$ for the downlink. At user terminal 120, the received symbol vector $\underline{r}_{dn}(k)$ is multiplied with the matrix $\underline{V}_{ut}^T(k)$ by a unit 360 and further scaled with the matrix $\underline{\Sigma}^{-1}(k)$ by a unit 362 to obtain the recovered data symbol vector $\hat{\underline{s}}_{dn}(k)$ for the downlink.

For the uplink, at user terminal 120, the data symbol vector $\underline{s}_{up}(k)$ is multiplied with the matrix $\underline{V}_{ut}(k)$ by a unit 390 and further scaled with the correction matrix $\underline{K}_{ut}(k)$ by a unit 392 to obtain the transmit symbol vector $\underline{x}_{up}(k)$ for the uplink. At access point 110, the received symbol vector $\underline{r}_{up}(k)$ is multiplied with the matrix $\underline{U}_{ap}^H(k)$ by a unit 340 and further scaled with the matrix $\underline{\Sigma}^{-1}(k)$ by a unit 342 to obtain the recovered data symbol vector $\hat{\underline{s}}_{up}(k)$ for the uplink.

Figure 4:
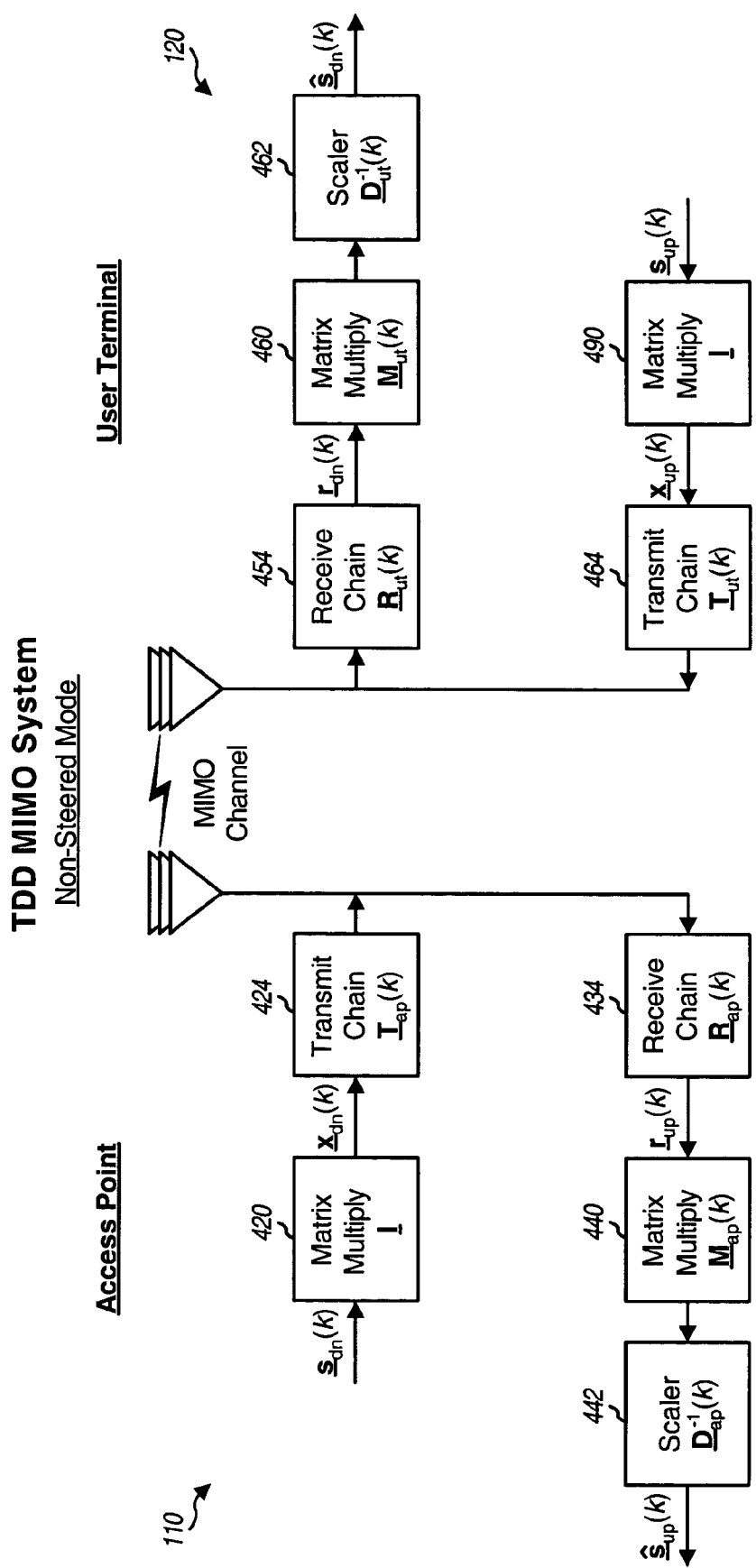

FIG. 4 shows the spatial processing at access point 110 and user terminal 120 for downlink and uplink data transmission for the non-steered mode in the MIMO WLAN system. For the downlink, at access point 110, the data symbol vector $\underline{s}_{dn}(k)$ is multiplied with the identity matrix $\underline{I}$ by a unit 420 to obtain the transmit symbol vector $\underline{x}_{dn}(k)$ for the downlink. At user terminal 120, the received symbol vector $\underline{r}_{dn}(k)$ is multiplied with a spatial filter matrix $\underline{M}_{ut}(k)$ by a unit 460 and further scaled with a diagonal matrix $\underline{D}_{ut}^{-1}(k)$ by a unit 462 to obtain the recovered data symbol vector $\hat{\underline{s}}_{dn}(k)$ for the downlink. The matrices $\underline{M}_{ut}(k)$ and $\underline{D}_{ut}^{-1}(k)$ are derived based on the effective downlink channel response matrix $\underline{H}_{edn}(k)$ and using the CCMI, MMSE, SIC, or some other technique.

For the uplink, at user terminal 120, the data symbol vector $\underline{s}_{up}(k)$ is multiplied with the identity matrix $\underline{I}$ by a unit 490 to obtain the transmit symbol vector $\underline{x}_{up}(k)$ for the uplink. At access point 110, the received symbol vector $\underline{r}_{up}(k)$ is multiplied with a spatial filter matrix $\underline{M}_{ap}(k)$ by a unit 440 and further scaled with a diagonal matrix $\underline{D}_{ap}^{-1}(k)$ by a unit 442 to obtain the recovered data symbol vector $\hat{\underline{s}}_{up}(k)$ for the uplink. The matrices $\underline{M}_{ap}(k)$ and $\underline{D}_{ap}^{-1}(k)$ are derived based on the effective uplink channel response matrix $\underline{H}_{eup}(k)$ and using the CCMI, MMSE, SIC, or some other technique.

Figure 5:
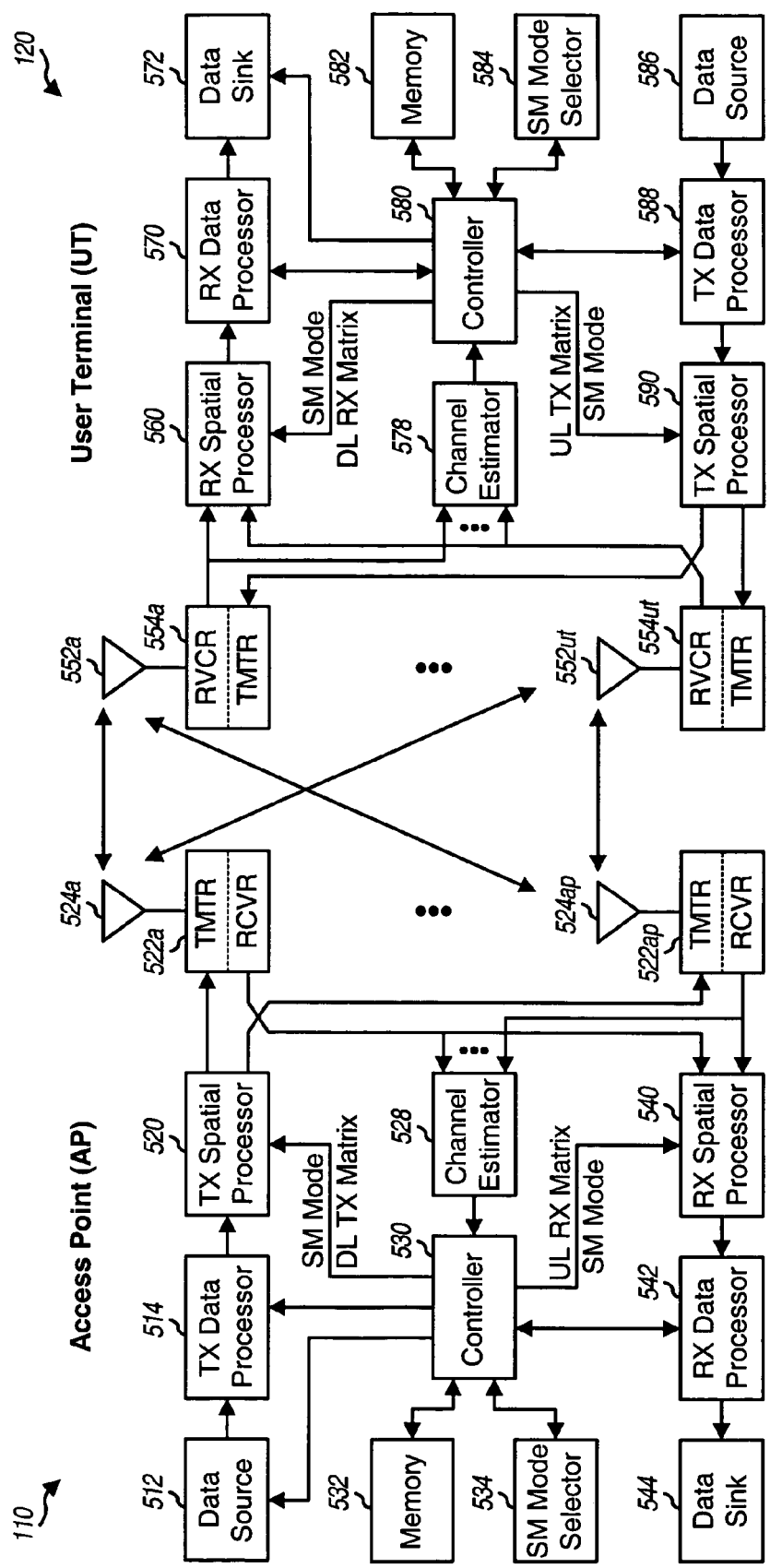
FIG. 5 shows a block diagram of the access point and user terminal.

FIG. 5 shows a block diagram of access point 110 and user terminal 120. On the downlink, at access point 110, a transmit (TX) data processor 514 receives traffic data from a data source 512 and control data from a controller 530. TX data processor 514 processes (e.g., encodes, interleaves, and symbol maps) each of $N_S$ data streams based on the coding and modulation schemes corresponding to the rate selected for the stream to obtain a data symbol stream. A TX spatial processor 520 receives $N_S$ data symbol streams from TX data processor 514, performs spatial processing (as required) on the data symbols, multiplexes in pilot symbols, and provides $N_{ap}$ transmit symbol streams for the $N_{ap}$ antennas. The processing by TX spatial processor 520 is dependent on whether the steered or non-steered mode is selected for use and may be performed as described above. Each transmitter unit (TMTR) 522 receives and processes (e.g., OFDM modulates and conditions) a respective transmit symbol stream to generate a downlink signal. $N_{ap}$ transmitter units 522a through 522ap provide $N_{ap}$ downlink signals for transmission from $N_{ap}$ antennas 524a through 524ap, respectively.

At user terminal 120, $N_{ut}$ antennas 552a through 552ut receive the $N_{ap}$ downlink signals, and each antenna provides a received signal to a respective receiver unit (RCVR) 554. Each receiver unit 554 performs processing (e.g., conditioning and OFDM demodulation) complementary to that performed by transmitter units 522 and provides a stream of received symbols. A receive (RX) spatial processor 560 performs spatial processing on $N_{ut}$ received symbol streams from $N_{ut}$ receiver units 554 and provides $N_S$ streams of recovered data symbols. The processing by RX spatial processor 560 is dependent on whether the steered or non-steered mode is selected for use and may be performed as described above. An RX data processor 570 processes (e.g., demaps, deinterleaves, and decodes) the $N_S$ recovered data symbol streams to obtain Ns decoded data streams, which may be provided to a data sink 572 for storage and/or a controller 580 for further processing.

A channel estimator 578 estimates the downlink channel response based on received pilot symbols and provides channel estimates, which may include channel gain estimates, SNR estimates, and so on. Controller 580 receives the channel estimates, derives the matrices used by RX spatial processor 560 and a TX spatial processor 590 for spatial processing, and determines a suitable rate for each data symbol stream sent on the downlink. The rates and uplink data are processed by a TX data processor 588, spatially processed (as required) by TX spatial processor 590, multiplexed with pilot symbols, conditioned by $N_{ut}$ transmitter units 554a through 554ut, and transmitted via antennas 552a through 552ut.

At access point 110, the $N_{ut}$ transmitted uplink signals are received by antennas 524, conditioned and demodulated by receiver units 522, and processed by an RX spatial processor 540 and an RX data processor 542. The rates are provided to controller 530 and used to control data transmission on the downlink.

Access point 110 and user terminal 120 may perform similar or different processing for uplink data and pilot transmission.

Controllers 530 and 580 control the operation of various processing units at access point 110 and user terminal 120, respectively. SM mode selectors 534 and 584 select the appropriate spatial multiplexing mode to use for access point 110 and user terminal 120, respectively, based on various factors such as those described above. Memory units 532 and 582 store data and program codes used by controllers 530 and 580, respectively.

Figure 6:
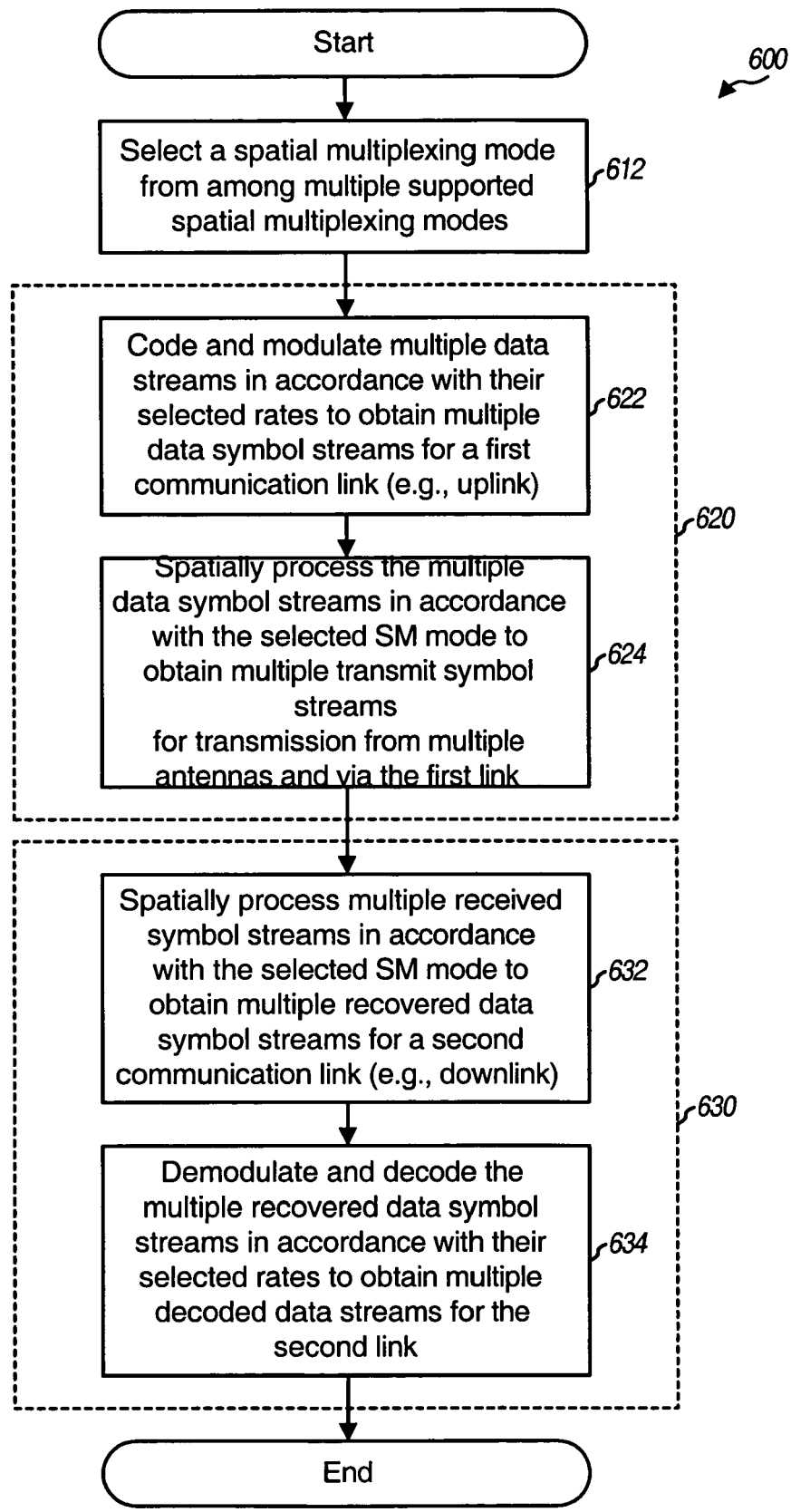
FIG. 6 shows a process for transmitting and receiving data in the MIMO system.

FIG. 6 shows a flow diagram of a process 600 for transmitting and receiving data in the MIMO system. Process 600 may be performed by a user terminal and an access point for data transmission on the downlink and uplink.

Initially, an SM mode is selected from among multiple supported SM modes, which may include the steered and non-steered modes described above (step 612). The mode selection may be based on the calibration status of the terminal, the amount of data to send, the SNR and/or channel conditions, the capability of the other communicating entity, and so on. The selected SM mode may also change during a data session.

For data transmission (block 620), multiple data streams for a first communication link (e.g., the uplink) are coded and modulated in accordance with their selected rates to obtain multiple data symbol streams for the first link (step 622). These data symbol streams are then spatially processed in accordance with the selected SM mode to obtain multiple transmit symbol streams for transmission from multiple antennas and via the first link (step 624). The transmit spatial processing is with a matrix of steering vectors for the steered mode and with the identity matrix for the non-steered mode.

For data reception (block 630), multiple received symbol streams, obtained from the multiple antennas for a second communication link (e.g., the downlink), are spatially processed in accordance with the selected SM mode to obtain multiple recovered data symbol streams (step 632). The receive spatial processing is with a matrix of eigenvectors for the steered mode and a spatial filter matrix for the non-steered mode. The spatial filter matrix may be derived based on the CCMI, MMSE, SIC, or some other technique. The recovered data symbol streams are then demodulated and decoded in accordance with their selected rates to obtain multiple decoded data streams for the second link (step 634).

The data transmission in block 620 and the data reception in block 630 may occur simultaneously or at different times. Pilots and rates are also transmitted and received in order to support data transmission and reception with the selected SM mode.

The multi-mode terminal and access point and the data transmission/reception techniques described herein may be implemented by various means. For example, these entities and techniques may be implemented in hardware, software, or a combination thereof. For a hardware implementation, the processing units for these entities and techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory units 532 and 582 in FIG. 5) and executed by a processor (e.g., controllers 530 and 580). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A terminal in a wireless multiple-input multiple-output (MIMO) communication system, comprising:
a mode selector operable to select a spatial multiplexing mode from among a plurality of spatial multiplexing modes supported by the terminal, wherein each of the plurality of spatial multiplexing modes supports simultaneous transmission of multiple data symbol streams via multiple spatial channels of a MIMO channel formed with a plurality of antennas at the terminal;
a transmit spatial processor operable to spatially process a first plurality of data symbol streams in accordance with the selected spatial multiplexing mode to obtain a plurality of transmit symbol streams for transmission from the plurality of antennas and via a first communication link; and
a receive spatial processor operable to spatially process a plurality of received symbol streams, obtained from the plurality of antennas, in accordance with the selected spatial multiplexing mode to obtain a plurality of recovered data symbol streams, which are estimates of a second plurality of data symbol streams sent via a second communication link.

2. The terminal of claim 1, wherein the plurality of spatial multiplexing modes include a steered mode and a non-steered mode.

3. The terminal of claim 2, wherein the steered mode supports simultaneous transmission of multiple data symbol streams via multiple orthogonal spatial channels of the MIMO channel, and wherein the non-steered mode supports simultaneous transmission of multiple data symbol streams from the plurality of antennas.

4. The terminal of claim 2, wherein
the transmit spatial processor is operable to multiply the first plurality of data symbol streams with a matrix of steering vectors for the steered mode and with an identity matrix for the non-steered mode, and the receive spatial processor is operable to multiply the plurality of received symbol streams with a matrix of eigenvectors for the steered mode and with a spatial filter matrix for the non-steered mode.

5. The terminal of claim 4, further comprising:
a channel estimator operable to estimate a channel response of the second communication link; and
a controller operable to derive the spatial filter matrix based on the estimated channel response for the second communication link.

6. The terminal of claim 5, wherein the controller is operable to derive the spatial filter matrix based on a channel correlation matrix inversion (CCMI) technique or a minimum mean square error (MMSE) technique.

7. The terminal of claim 5, wherein the controller is operable to derive the spatial filter matrix based on a successive interference cancellation (SIC) technique and using a channel correlation matrix inversion (CCMI) technique or a minimum mean square error (MMSE) technique.

8. The terminal of claim 2, further comprising:
a transmit data processor operable to code and modulate a first plurality of data streams in accordance with a first plurality of rates to obtain the first plurality of data symbol streams for the first communication link; and
a receive data processor operable to demodulate and decode the plurality of recovered data symbol streams in accordance with a second plurality of rates to obtain a plurality of decoded data streams for the second communication link.

9. The terminal of claim 8, wherein the first plurality of rates are for a plurality of eigenmodes of the MIMO channel for the steered mode and are for the plurality of antennas for the non-steered mode.

10. The terminal of claim 2, wherein the mode selector is operable to select the steered mode if the terminal is calibrated and the non-steered mode if the terminal is not calibrated, and wherein channel response of the second communication link is reciprocal of channel response of the first communication link if the terminal is calibrated.

11. The terminal of claim 2, wherein the mode selector is operable to select the steered mode or the non-steered mode based on an amount of data to send, channel conditions, capability of an entity in communication with the terminal, or a combination thereof.

12. The terminal of claim 2, wherein the mode selector is operable to select the non-steered mode for a first portion of a data session and to select the steered mode for a remaining portion of the data session.

13. The terminal of claim 2, wherein the mode selector is operable to select the steered mode or the non-steered mode based on received signal-to-noise-and-interference ratio (SNR).

14. The terminal of claim 2, wherein the transmit spatial processor is further operable to multiplex a steered pilot for the steered mode and an unsteered pilot for the non-steered mode, wherein the steered pilot is transmitted on eigenmodes of the MIMO channel, and wherein the unsteered pilot comprises a plurality of orthogonal pilot transmissions from the plurality of antennas.

15. The terminal of claim 2, wherein the transmit spatial processor is further operable to multiplex an unsteered pilot for both the steered and non-steered modes, and wherein the unsteered pilot comprises a plurality of orthogonal pilot transmissions from the plurality of antennas.

16. The terminal of claim 1 and operable to communicate with an access point in the MIMO system.

17. The terminal of claim 1 and operable to communicate peer-to-peer with another terminal in the MIMO system.

18. The terminal of claim 1, wherein the MIMO system utilizes orthogonal frequency division multiplexing (OFDM), and wherein the transmit and receive spatial processors are operable to perform spatial processing for each of a plurality of subbands.

19. The terminal of claim 1, wherein the MIMO system is a time division duplex (TDD) system.

20. A method of processing data in a wireless multiple-input multiple-output (MIMO) communication system, comprising:
selecting a spatial multiplexing mode from among a plurality of spatial multiplexing modes, wherein each of the plurality of spatial multiplexing modes supports simultaneous transmission of multiple data symbol streams via multiple spatial channels of a MIMO channel;
spatially processing a first plurality of data symbol streams in accordance with the selected spatial multiplexing mode to obtain a plurality of transmit symbol streams for transmission from a plurality of antennas and via a first communication link; and
spatially processing a plurality of received symbol streams, obtained from the plurality of antennas, in accordance with the selected spatial multiplexing mode to obtain a plurality of recovered data symbol streams, which are estimates of a second plurality of data symbol streams sent via a second communication link.

21. The method of claim 20, wherein the plurality of spatial multiplexing modes include a steered mode and a non-steered mode, the steered mode supporting simultaneous transmission of multiple data symbol streams via multiple orthogonal spatial channels of the MIMO channel, and the non-steered mode supporting simultaneous transmission of multiple data symbol streams from the plurality of antennas.

22. The method of claim 21, wherein the first plurality of data symbol streams are multiplied with a matrix of steering vectors for the steered mode and with an identity matrix for the non-steered mode, and wherein the plurality of received symbol streams are multiplied with a matrix of eigenvectors for the steered mode and with a spatial filter matrix for the non-steered mode.

23. The method of claim 22, further comprising:
estimating a channel response of the second communication link; and
deriving the spatial filter matrix based on the estimated channel response for the second communication link.

24. The method of claim 23, wherein the spatial filter matrix is derived based on a channel correlation matrix inversion (CCMI) technique, a minimum mean square error (MMSE) technique, or a successive interference cancellation (SIC) technique.

25. An apparatus in a wireless multiple-input multiple-output (MIMO) communication system, comprising:
means for selecting a spatial multiplexing mode from among a plurality of spatial multiplexing modes, wherein each of the plurality of spatial multiplexing modes supports simultaneous transmission of multiple data symbol streams via multiple spatial channels of a MIMO channel;
means for spatially processing a first plurality of data symbol streams in accordance with the selected spatial multiplexing mode to obtain a plurality of transmit symbol streams;

means for transmitting the plurality of transmit symbol streams from a plurality of antennas and via a first communication link;

means for receiving a plurality of received symbol streams from the plurality of antennas for a second communication link; and means for spatially processing the plurality of received symbol streams in accordance with the selected spatial multiplexing mode to obtain a plurality of recovered data symbol streams, which are estimates of a second plurality of data symbol streams sent via the second communication link.

26. The apparatus of claim 25, wherein the plurality of spatial multiplexing modes include a steered mode and a non-steered mode, the steered mode supporting simultaneous transmission of multiple data symbol streams via multiple orthogonal spatial channels of the MIMO channel, and the non-steered mode supporting simultaneous transmission of multiple data symbol streams from the plurality of antennas.

27. The apparatus of claim 26, wherein the first plurality of data symbol streams are multiplied with a matrix of steering vectors for the steered mode and with an identity matrix for the non-steered mode, and wherein the plurality of received symbol streams are multiplied with a matrix of eigenvectors for the steered mode and with a spatial filter matrix for the non-steered mode.

28. The apparatus of claim 27, further comprising:

means for estimating a channel response of the second communication link; and means for deriving the spatial filter matrix based on the estimated channel response for the second communication link.

29. The apparatus of claim 28, wherein the spatial filter matrix is derived based on a channel correlation matrix inversion (CCMI) technique, a minimum mean square error (MMSE) technique, or a successive interference cancellation (SIC) technique.

30. An access point in a wireless multiple-input multiple-output (MIMO) communication system, comprising:

a mode selector operable to select a spatial multiplexing mode from among a plurality of spatial multiplexing modes supported by the access point, wherein each of the plurality of spatial multiplexing modes supports simultaneous transmission of multiple data symbol streams via multiple spatial channels of a MIMO channel formed with a plurality of antennas at the access point;

a transmit spatial processor operable to spatially process a first plurality of data symbol streams in accordance with the selected spatial multiplexing mode to obtain a plurality of transmit symbol streams for transmission from the plurality of antennas and via a first communication link; and a receive spatial processor operable to spatially process a plurality of received symbol streams, obtained from the plurality of antennas, in accordance with the selected spatial multiplexing mode to obtain a plurality of recovered data symbol streams, which are estimates of a second plurality of data symbol streams sent via a second communication link.

31. The access point of claim 30, wherein the plurality of spatial multiplexing modes include a steered mode and a non-steered mode.

32. The access point of claim 31, wherein the transmit spatial processor is operable to multiply the first plurality of data symbol streams with a matrix of steering vectors for the steered mode and with an identity matrix for the non-steered mode, and the receive spatial processor is operable to multiply the plurality of received symbol streams with a matrix of eigenvectors for the steered mode and with a spatial filter matrix for the non-steered mode.

* * * * *